United States Patent
Xu

(10) Patent No.: US 7,348,988 B2
(45) Date of Patent: Mar. 25, 2008

(54) TEXTURE CACHE CONTROL USING AN ADAPTIVE MISSING DATA TABLE IN A MULTIPLE CACHE COMPUTER GRAPHICS ENVIRONMENT

(75) Inventor: Jiangming Xu, San Jose, CA (US)

(73) Assignee: Via Technologies, Inc., Hsin-Tien, Taipei (TW)

( * ) Notice: Subject to any disclaimer, the term of this patent is extended or adjusted under 35 U.S.C. 154(b) by 431 days.

(21) Appl. No.: 11/123,786

(22) Filed: May 6, 2005

(65) Prior Publication Data
US 2006/0250408 A1    Nov. 9, 2006

(51) Int. Cl.
*G09G 5/36* (2006.01)
(52) U.S. Cl. ............ 345/557; 345/552; 711/119; 711/129
(58) Field of Classification Search ........ 711/144; 345/557, 582
See application file for complete search history.

(56) References Cited

U.S. PATENT DOCUMENTS 6,437,789 B1 * 8/2002 Tidwell et al. ............ 345/557
6,629,188 B1 * 9/2003 Minkin et al. ............ 345/557
6,825,848 B1 * 11/2004 Fu et al. .................. 345/557

OTHER PUBLICATIONS

Michael Cox, Narendra Bhandari, Michael Shantz, "Multi-Level Texture Caching for 3D Graphics Hardware," 1998, Proceedings of ACM/IEEE International Symposium on Computer Architecture(ISCA).*

Ziyad S. Hakura and Anoop Gupta, "The Design and Analysis of a Cache Architecture for Texture Mapping," 1997, 24th International Symposium on Computer Architecture.*

* cited by examiner

*Primary Examiner*—Hai V. Tran
*Assistant Examiner*—Phi Hoang
(74) *Attorney, Agent, or Firm*—Thomas, Kayden, Horstemeyer & Risley

(57) ABSTRACT

Provided are methods, systems and graphics processing apparatus, for improving graphics system performance using an adaptive missing table in a multiple cache scheme, such that the table size is dependent on the completeness of the graphics data.

25 Claims, 10 Drawing Sheets

| TAG | P0 F1 | P1 F1 | P2 F1 | P3 F1 | P0 F2 | P1 F2 | P2 F2 | P3 F2 | 1ST MISS | 2ND MISS |
|---|---|---|---|---|---|---|---|---|---|---|
| VALID | 1 | 0 | 1 | 1 | 1 | 0 | 1 | 1 | | |
| | | | | | | | | | | |
| S0/SS0 | 1 | 0 | 0 | 1 | 0 | 0 | 1 | 1 | TAG-0-1 | TAG-2-2 |
| S0/SS1 | 1 | 0 | 0 | 1 | 0 | 0 | 1 | 0 | TAG-0-1 | TAG-3-1 |
| S0/SS2 | 1 | 0 | 0 | 0 | 0 | 0 | 0 | 0 | TAG-0-1 | ---- |
| S0/SS3 | 1 | 0 | 0 | 0 | 0 | 1 | 0 | 1 | TAG-0-1 | TAG-3-2 |
| S1/SS0 | 0 | 0 | 1 | 1 | 1 | 0 | 0 | 0 | TAG-3-1 | TAG-0-2 |
| S1/SS1 | 0 | 0 | 0 | 1 | 1 | 0 | 1 | 0 | TAG-0-2 | TAG-2-2 |
| S1/SS2 | 0 | 0 | 0 | 0 | 1 | 0 | 1 | 0 | TAG-0-2 | ---- |
| S1/SS3 | 0 | 0 | 0 | 0 | 1 | 0 | 0 | 1 | TAG-0-2 | TAG-3-2 |

FIG. 11

TEXTURE CACHE CONTROL USING AN ADAPTIVE MISSING DATA TABLE IN A MULTIPLE CACHE COMPUTER GRAPHICS ENVIRONMENT

TECHNICAL FIELD

The present disclosure is generally related to texture caches, and, more particularly, is related to texture cache control using an adaptive table in a multiple cache computer graphics environment.

BACKGROUND

As is known, computer graphics processing systems process large amounts of data, including texture data, among others. A texture is a digital image, often rectangular, having a (u, v) coordinate space. The smallest addressable unit of a texture is a texel, which is assigned a specific (u, v) coordinate based on its location. In a texture mapping operation, a texture is mapped to the surface of a graphical model as the model is rendered to create a destination image. In the destination image, pixels are located at specific coordinates in the (x, y) coordinate system.

Texture data often resides in system memory, which is a shared resource. In many computer systems, other devices may attempt to access data used by the graphics processing system or utilize a shared system bus, both of which may result in increased data access time for the graphics processing system. Additionally, requests for data from system memory may take excessive amounts of time for other reasons. Accordingly, accessing system memory may have a performance inhibiting effect on graphics processing systems.

One technique for improving data accessibility is through a texture cache that is dedicated to storing texture data. The texture cache is provided texture data from the system memory before the data is required for texture processing, thereby providing the graphics system with the texture data and reducing the requirement to access system memory. This, in turn, reduces problems associated with memory latency.

A texture cache, however, generally lacks the capacity to store the entire texture map. A texture cache sufficient to store an entire texture map would likely suffer from reduced performance because cache access time generally increases as the cache size increases. Further, an increased cache size requires more chip resources, which are often already at a premium.

One common approach to increasing cache size without significantly degrading cache performance is to provide two-level caches. The first level in a two-level cache is provided for the data that is most likely to be immediately required, whereas the second level stores data more likely to be used in the near future. A two-level cache provides benefits in terms of increased cache size without a significant decrease in cache performance by providing increased data availability and decreased memory access time. The use of a two-level cache, however, creates issues regarding the selection and transfer of the data to the cache system and the deletion of data from the cache system. Thus, without an appropriate determination of which data to request, transfer, and delete, the benefits of a two-level cache system may be reduced.

In other words, an efficient technique must be established for allocating cache spatial and temporal resources such that the texture data required for processing is available and complete in the cache system. For instance, when the block of data required is found in the cache, it is a "hit" and a copy of the requested data is sent to the processor. Alternatively, when the block of data is not found, it is a "miss" and the requested data must ultimately be read from the system memory and transferred to both the cache and the processor. The memory access for the "miss" creates undesirable memory latency. Determining an efficient technique for controlling the cache system will address the important need for fast processing of graphics data in a computer graphics environment.

Thus, a heretofore-unaddressed need exists in the industry to address the aforementioned deficiencies and inadequacies.

SUMMARY

Embodiments of the present disclosure may be viewed as providing a graphics processing apparatus, comprising: a first cache that communicates texture data to a second cache, wherein the data corresponds to a packet, such that a packet comprises a plurality of pixels; a data formatter that transforms the texture data received by the second cache into set-associative texture data; an adaptive miss data table that increases in a first dimension according to the number of misses in the set-associative texture data; and texture cache control logic that utilizes the adaptive miss table to split pixel texture data over more than one cycle, wherein the pixel texture data is received by a texture filter unit.

Briefly described, in architecture, one embodiment, among others, can be implemented as a graphics processing system capable of operating on a packet, comprising: a packet comprising a plurality of pixels, such that each of the plurality of pixels corresponds to a plurality of texels having texel locations; a first cache that receives texture data from a system memory and is partitioned into a plurality of slots; a data formatter that translates the texture data into set-associative texture data; a second cache that receives the set-associative texture data; a texture filter FIFO configured to store the set-associative texture data; a texture filter unit that receives the set-associative texture data from the texture filter FIFO and produces a plurality of texture values corresponding to the plurality of pixels, such that the set-associative texture data available to the texture filter unit is filtered to produce the texture values for the plurality of pixels; first test logic configured to perform a hit test on the second cache and then the first cache for misses in the second cache; and a logical data table, maintained in the first test logic, that stores a plurality of status flags relative to the hit test.

An embodiment of the present disclosure can also be viewed as providing a method for processing texture data in a graphics processor, comprising the steps of: organizing a plurality of pixels into a packet; receiving packet graphics data into a first cache; communicating the packet graphics data to a second cache; sorting the graphics data into a data table, wherein the sorting is based on a graphics data coordinate vector and wherein the data table comprises a first axis and a second axis; generating a pixel valid mask that marks valid entries along the first axis of the data table; performing a test of valid data entries in the data table; determining a first miss texture address, for one of a plurality of subsets, wherein the subset represents one of a plurality of common second axis values; generating an additional entry along the first axis having the common second axis value; masking the first miss texture address and hit texture addresses in the data table; and entering pixel split data, including the hit texture addresses and the first miss texture address into a texture filter FIFO, to fetch missing data from memory.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 11 is a diagram illustrating an exemplary adaptive missing data table, as disclosed herein.

DETAILED DESCRIPTION

Figure 1:
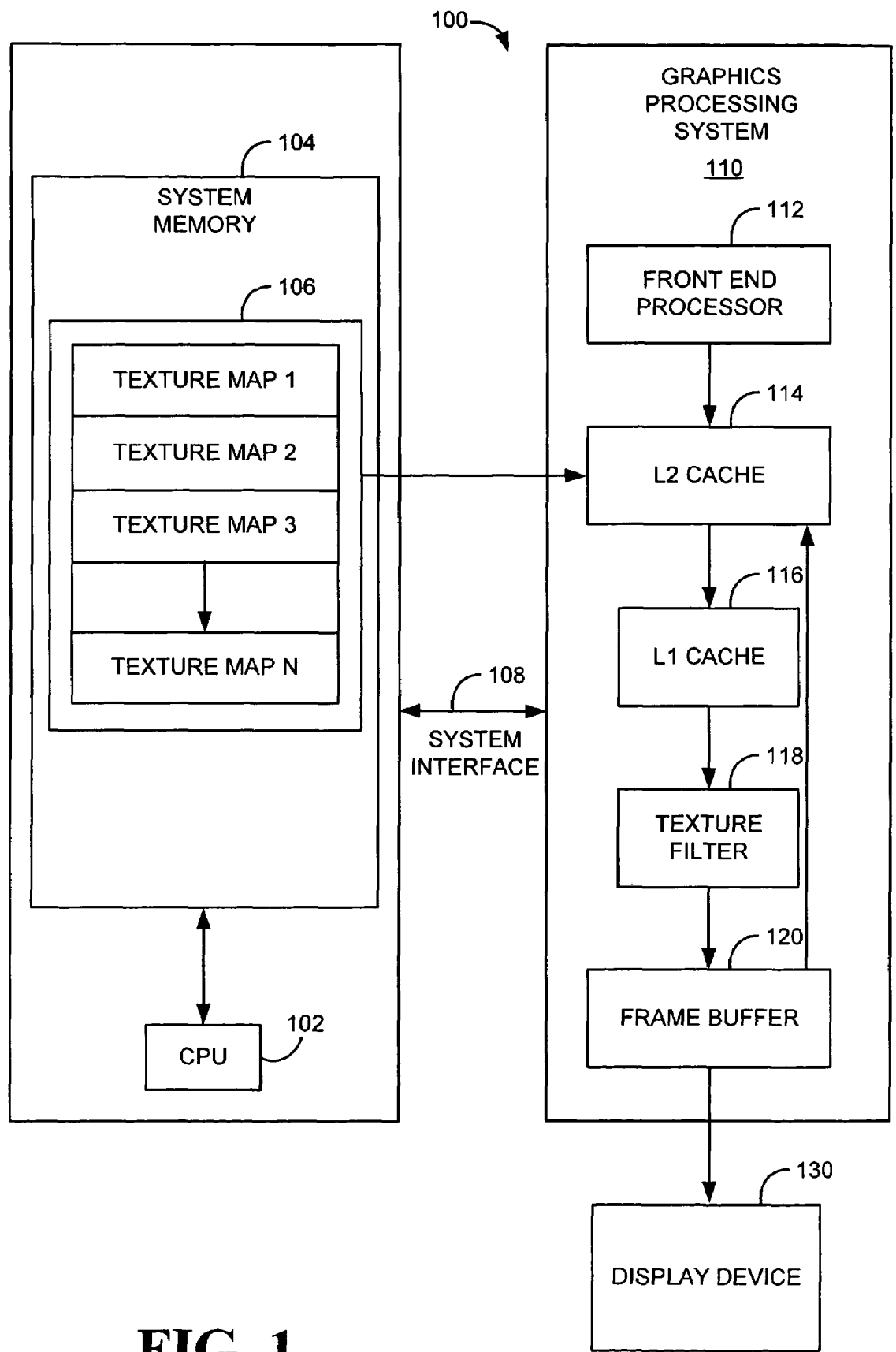
FIG. 1 is an illustration of a simplified block diagram of a computer system.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed therein. On the contrary, the intent is to cover all alternatives, modifications and equivalents included within the spirit and scope of the disclosure as defined by the appended claims.

As will be described further herein, there are several locations in a graphics system where features or aspects of the disclosure may be implemented. Likewise, it will be appreciated from the description herein that there are systems and environments in fields other than computer graphics where the concepts of the disclosure may be employed as well.

Reference is made to FIG. 1, which illustrates a simplified block diagram of a computer system 100. The computer system 100 includes a CPU 102, a system memory 104 and a graphics processing system 110. The CPU 102 performs various functions, including determining information, such as a viewpoint location, allowing for the generation of graphic displays. The system memory 104 stores a variety of data, including graphic display data such as multiple texture maps 106. The graphics processing system 110, based on information determined by the CPU 102 and data stored in the system memory 104, generates display data for a display device 130, such as, for example, a monitor.

The CPU 102 provides requests to the graphics processing system 110 over a system interface 108, including requests to process and display graphics information. Graphics requests from the CPU 102 are received by the graphics processing system 110 and provided to a front end processor 112. The front end processor 112 generates a pixel stream containing pixel coordinates concomitant to the display device 130.

Information relating to the pixel coordinates generated by the front end processor 112 is provided to a texture filter 118. The texture filter 118 filters the information performing, for example, bilinear filtering, trilinear filtering, or a combination thereof, and generates texture data for each pixel. The texture data is a component of the final color data that is sent to a frame buffer 120, which is used to generate a display on a display device 130.

The graphics processing system 110 includes multiple caches. The caches include a level 1 ("L1") cache 116 and a level 2 ("L2") cache 114. The L1 and the L2 caches store portions of texture maps 106 used during graphics processing. The texture maps 106 contain texture information for geometric objects. The texture information is stored as individual texture elements known as texels, which are used during graphics processing to define color data displayed at pixel coordinates. The texture data flows from the system memory 104 to the L2 cache 114, then from the L2 cache 114 to the L1 cache 116.

Figure 2:
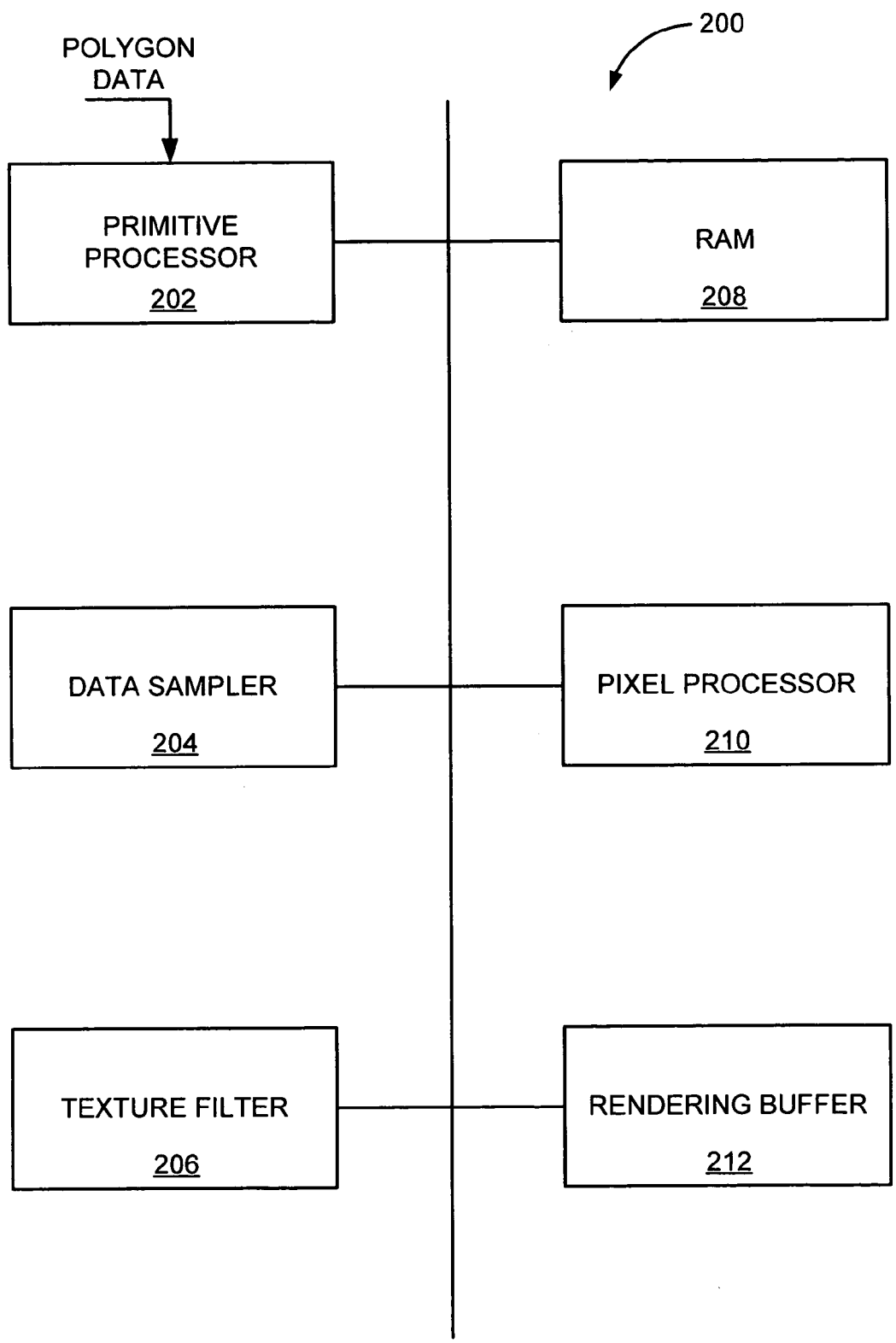
FIG. 2 is a block diagram illustrating an exemplary system for performing texture-filtering operations of the present disclosure.

Reference is briefly made to FIG. 2, which is a block diagram illustrating an exemplary system 200 for performing texture filtering operations of the present disclosure. The system 200 is typically implemented in a graphics processing system within a computer or similar processing device. The system 200 includes a primitive processor 202, a data sampler 204, a texture filter 206, RAM 208 for storing textures, a pixel processor 210 and a rendering buffer 212.

The primitive processor 202, which may be a triangle processor, typically receives the three-dimensional geometry elements (e.g., triangles or other graphic primitives) and processes the data describing the size, shape, position, and other relative characteristics of the graphics primitives. In some cases, the primitive processor 202 is also capable of generating edge functions of the primitives. These primitives may be defined in three-dimensions using Euclidian coordinates or in four-dimensions using homogenous coordinates, and subsequently, projected onto a two-dimensional plane by a known algorithm.

The data sampler 204 selects a finite set of values from the polygon data received by the primitive processor 202. The sampling of the polygon data may occur at different resolutions. For example, interior portions of a polygon may be sampled at a rate, which is required to generate the destination screen resolution, while the detected edges of a polygon may be super-sampled at a higher resolution.

The texture filter 206 performs one of the filtering techniques (e.g., bilinear filtering, trilinear filtering, box filtering, and/or a combination thereof) to calculate the color value (or other attribute) of a new texel, which is then assigned to a particular pixel. The texture filter 206 may generate the filtered textured pixel values based on data received from the RAM 208. Additionally, the texture filter 206 may be used in various types of applications such as in rendering multi-rate data samples (polygon data sampling at different resolutions).

The pixel processor 210 performs rendering operations. The rendering operations may be altered in a selected manner to generate various effects such as simulated light sources and shadows. Finally, the rendering buffer 212 stores images, which may be displayed in a display device or used to render another image.

Figure 3:
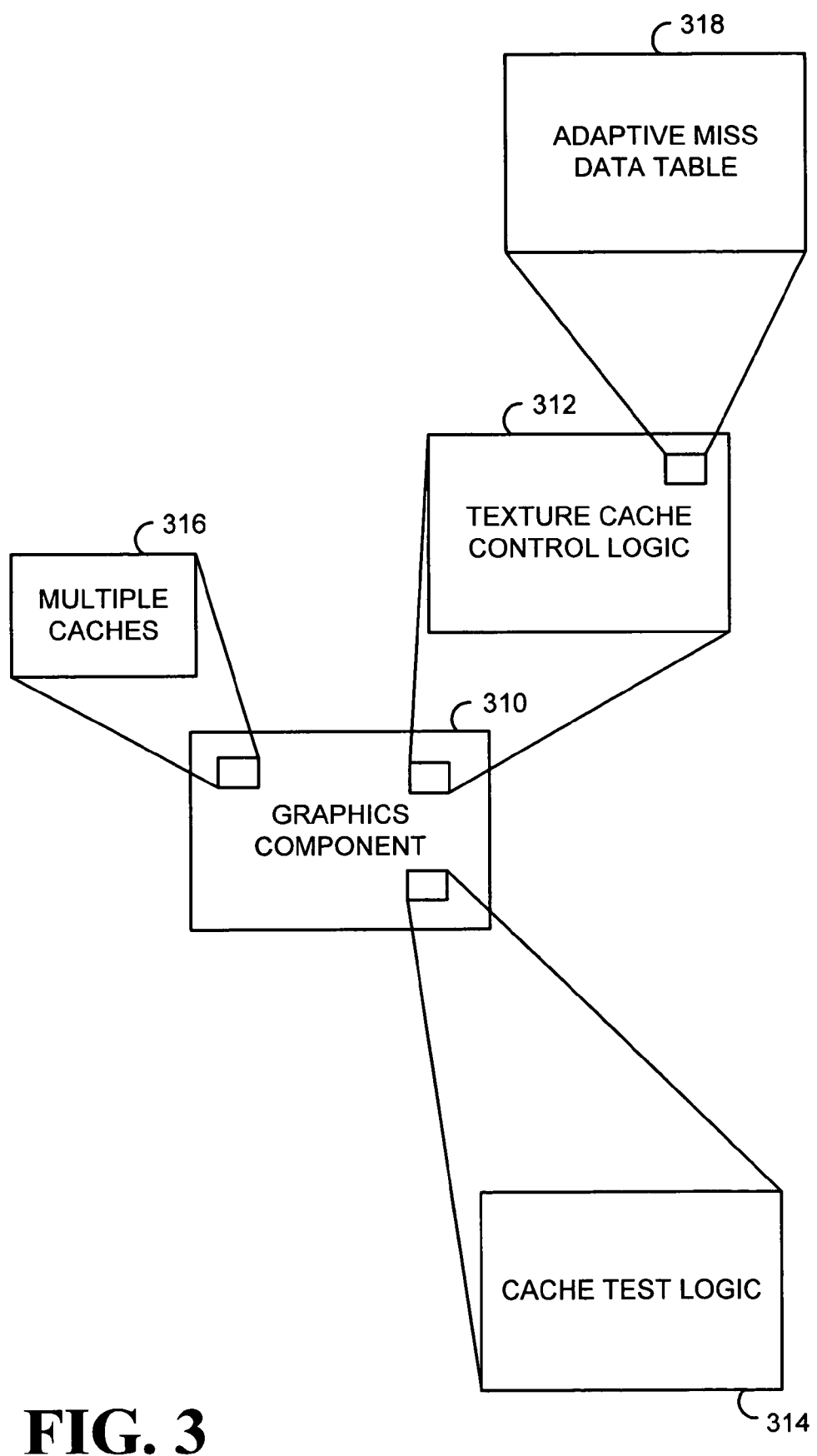
FIG. 3 illustrates certain basic components of an embodiment of the disclosure.

Reference is made briefly to FIG. 3, which illustrates certain basic components of an embodiment of the disclosure. FIG. 3 includes a component labeled "Graphics Component" 310, which may designate or represent hardware components in a graphics pipeline. Within this component, logic 312 may be provided for texture cache control, which provides data and cache control functions corresponding to multiple caches 316, also within the graphics component. As discussed below, the multiple caches include the L1 cache, hereinafter referred to as L1, and the L2 cache, hereinafter referred to as L2. The texture cache control logic 312 includes an adaptive missing data table 318 for facilitating the split of pixel data over more than one cycle in order to improve the utilization of the texture filter resources. Likewise, cache test logic 314 may be provided for evaluating the completeness of texture data prior to texture filtering to improve the resource utilization of the texture filter.

Figure 4:
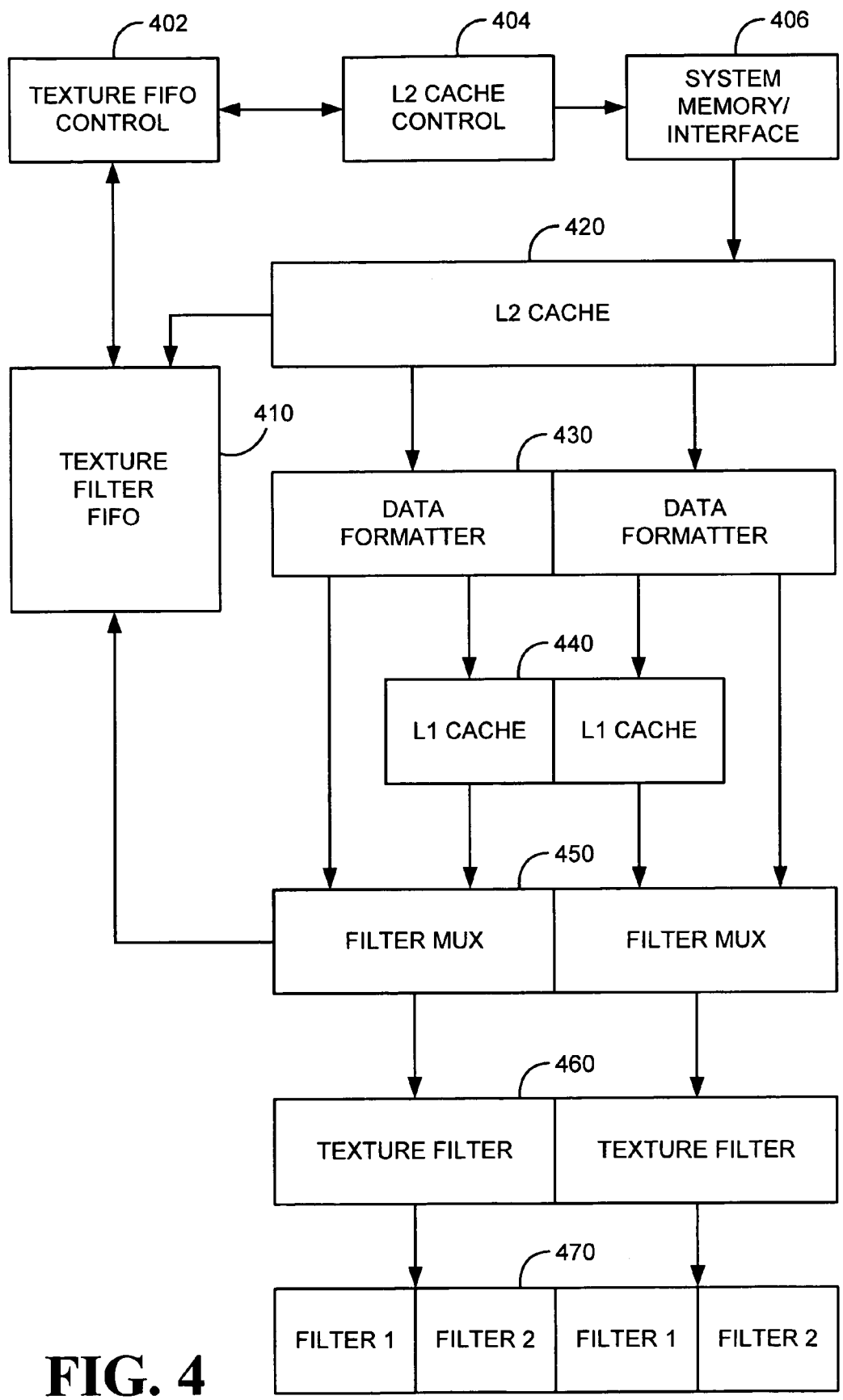
FIG. 4 is a block diagram illustrating an exemplary arrangement of logical components configured to process texture data using the techniques disclosed herein.

Reference is now made to FIG. 4, which is a block diagram illustrating an exemplary arrangement of logical components configured to process texture data using the techniques disclosed herein. The system memory and memory interface 406 serve to provide the texture filter system with the texture data that is stored in texture maps. This texture data, when requested, may be provided in the form of texture address data to L2 420. Although the texture address data may be in the form of physical address data, some embodiments utilize logical address data, which will ultimately be resolved into physical address data. The system memory 406 receives data requests from the L2 cache control 404, which, in some embodiments, receives information regarding required texture data from the texture FIFO control 402. The texture FIFO control 402 manages the texture filter FIFO 410, which operates to compensate for the missing texture data access latency from the system memory 406 to L2 420.

Texture data in L2 420 is reformatted by the data formatter 430 to produce set-associative data for L1 440. As discussed later, L1 440 is organized into sets and subsets of texels where set-associative mapping restricts the access of a subset in L1 to a corresponding channel in L2. Data stored in L1 440 is available to a filter MUX 450 for subsequent communication to the texture filter 460. The filter MUX 450 can also communicate with a texture filter FIFO 410 to communicate any additional data requirements. Additionally, where a portion of the data necessary to complete a filter operation resides in both L1 440 and L2 420, the filter MUX 450 may also receive texture data directly from L2 420 through the data formatter. The filter MUX 450 serves to direct texture data from multiple data locations in L1 440 and L2 420 to the texture filter 460. Since the texture data needs to be available for the texture filter 460 to perform, the filter MUX 450 may select a texture data set that is ready for the texture filter 460 while unavailable data is fetched for subsequent processing. The texture filter 460 may be divided into individual filter elements 470, such that the filter elements 470 may be capable of performing the filtering independent of each other or in combination.

Figure 5:
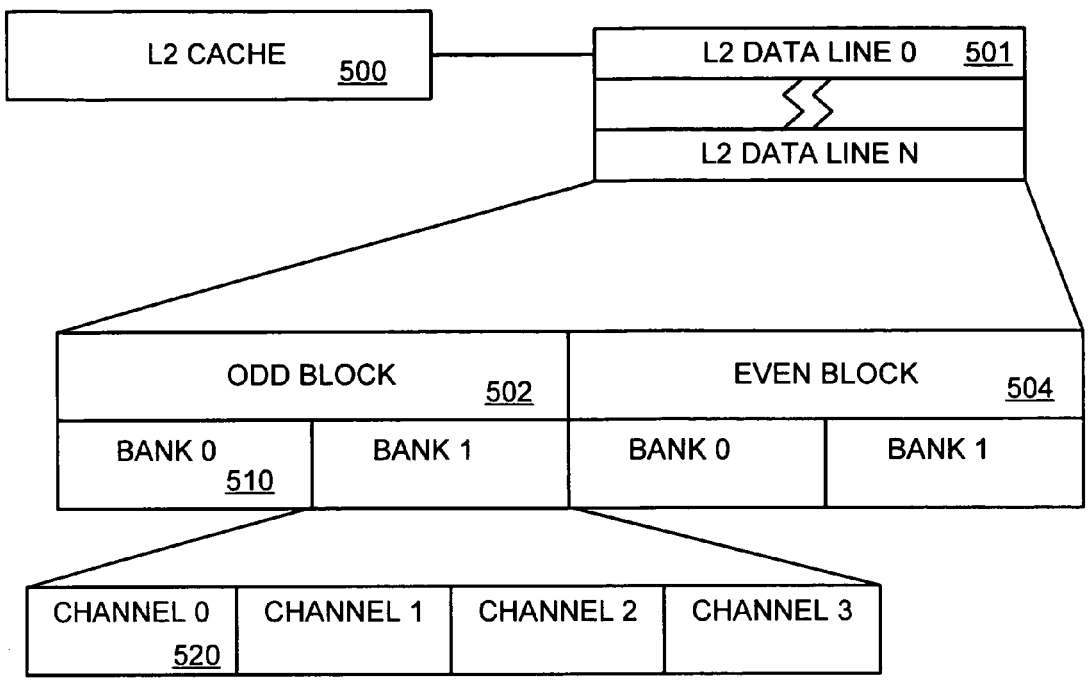
FIG. 5 is a block diagram illustrating an exemplary L2 cache organizational format.

Reference is now made to FIG. 5, which is a block diagram illustrating an exemplary L2 cache organizational format under the disclosure herein. The L2 cache 500 includes multiple L2 data lines 501. Each L2 data line 501 is divided into an even block 504 and an odd block 502. The even block 504 serves to process texture data from the even pipelines or cache lines and the odd block 502 serves to process texture data from the odd pipelines or cache lines. Within each of the blocks 502, 504, L2 is subdivided into banks 510. Although, as shown, each block includes two banks, one of ordinary skill in the art knows or will know that a cache with blocks that include more than two banks or, in the alternative, are not subdivided at all is within the scope and spirit of this disclosure. Each bank 510 is further subdivided into multiple channels 520. Although, as shown, the L2 data line 501 is configured to include two blocks, four banks and 16 channels, one of ordinary skill in the art knows or will know that a cache with blocks, banks and channels that include more or less than the subdivision illustrated is within the scope and spirit of this disclosure. Additionally, L2 500 is configured as multiple L2 data lines 501 including for example 64, 128, 256, or 512, among others. Further, each L2 data line 500 may be 128, 256, 512, 1024, or 2048 bits wide, among others.

Figure 6:
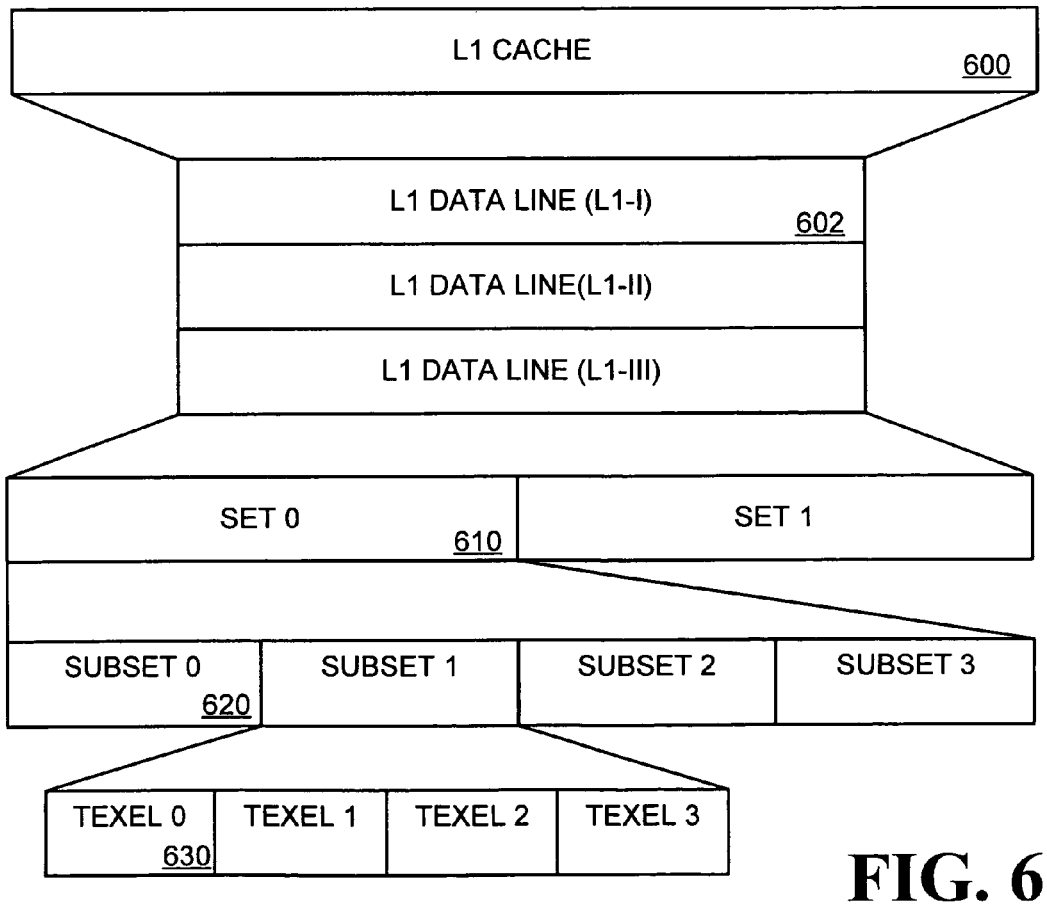
FIG. 6 is a block diagram illustrating an exemplary L1 cache organizational format.

Reference is now made to FIG. 6, which is a block diagram illustrating an exemplary L1 organizational format. The embodiment of L1 as shown in FIG. 6 includes three L1 data lines 602. One of ordinary skill in the art will appreciate that an L1 having more or less than three L1 data lines 602 is consistent with the scope and spirit of this disclosure. The exemplary L1 data lines 602 are divided into two sets 610, each of which are subdivided into four subsets 620. Each of the subsets 620 includes the texture data of four texels 630. One of ordinary skill in the art will appreciate that the number of subsets and texels shown in L1 600 is merely exemplary and is not intended to limit the scope of the disclosure in any way. Additionally, L1 600 may be 128, 256, 512, 1024, or 2048 bits wide, among others. In some embodiments, the width of L1 may be an integer factor of the width of L2 such that multiple L2 data lines 501 may be loaded into a single L1 data line 602. By way of example, L2 may be 1024 bits wide and L1 may be 2048 bits wide such that two L2 data lines 501 could be loaded into a single L1 data line 602.

Figure 7:
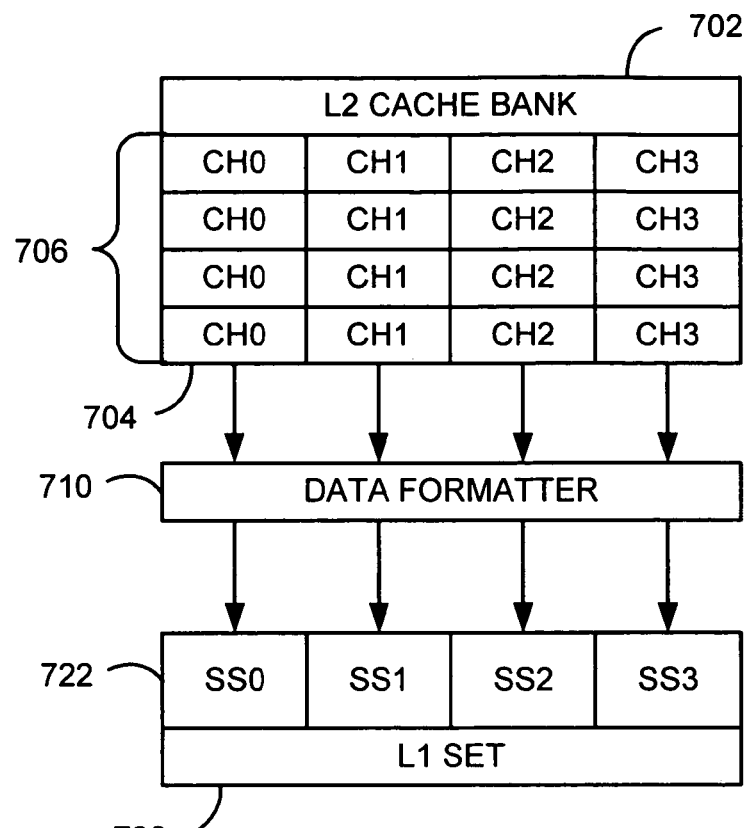
FIG. 7 is a block diagram illustrating an exemplary data transfer from one bank of L2 to a corresponding set of L1 through a data formatter.

Reference is now made to FIG. 7, which is a block diagram illustrating an exemplary data transfer from one bank of L2 to a corresponding set of L1 through a data formatter. Consistent with the above discussion, the exemplary L2 bank 702 includes multiple data lines 706, organized into four channels, such that, for example, "CH0" is a data value in one of the L2 data lines in channel 0. The data is transmitted through a data formatter 710, which produces set-associative data for the corresponding L1 set 720. As discussed above, L1 sets are divided into L1 subsets 722, such that "SS0" is subset 0 within a set. The set-associative mapping means that only data from channel 0 may be moved into subset 0 within the same bank/set. Consistent with the above example in FIG. 6, each subset of 2×2 texels in each L1 set is set-associative mapped rather than direct mapped, thus providing more flexibility to cover a more sparse area in the texture space using the same size L1.

Figure 8:
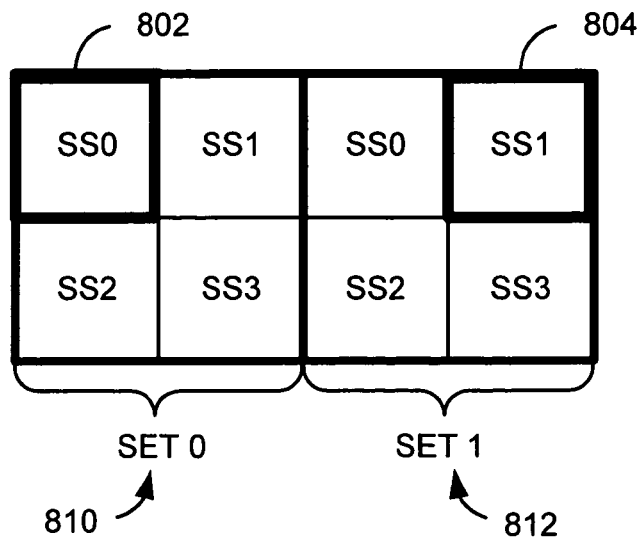
FIG. 8 is a block diagram illustrating an exemplary utilization of set-associative data in an L1 cache.

The set-associative mapping feature is particularly effective in an architecture, which features a pixel packer. Reference is now made to FIG. 8, which is a block diagram illustrating an exemplary utilization of set-associative data in L1. For example, subset SS0 802 and subset SS1 804 are needed for two different L1 texture addresses in the same pixel packet. If a direct mapping scheme were used, the pixel data would be split into two different passes since the two subsets are in two different sets, namely set 0 810 and set 1 812. Using the set-associative mapping, the two subsets can exist within one set thereby eliminating the requirement to split the pixel data.

Figure 9:
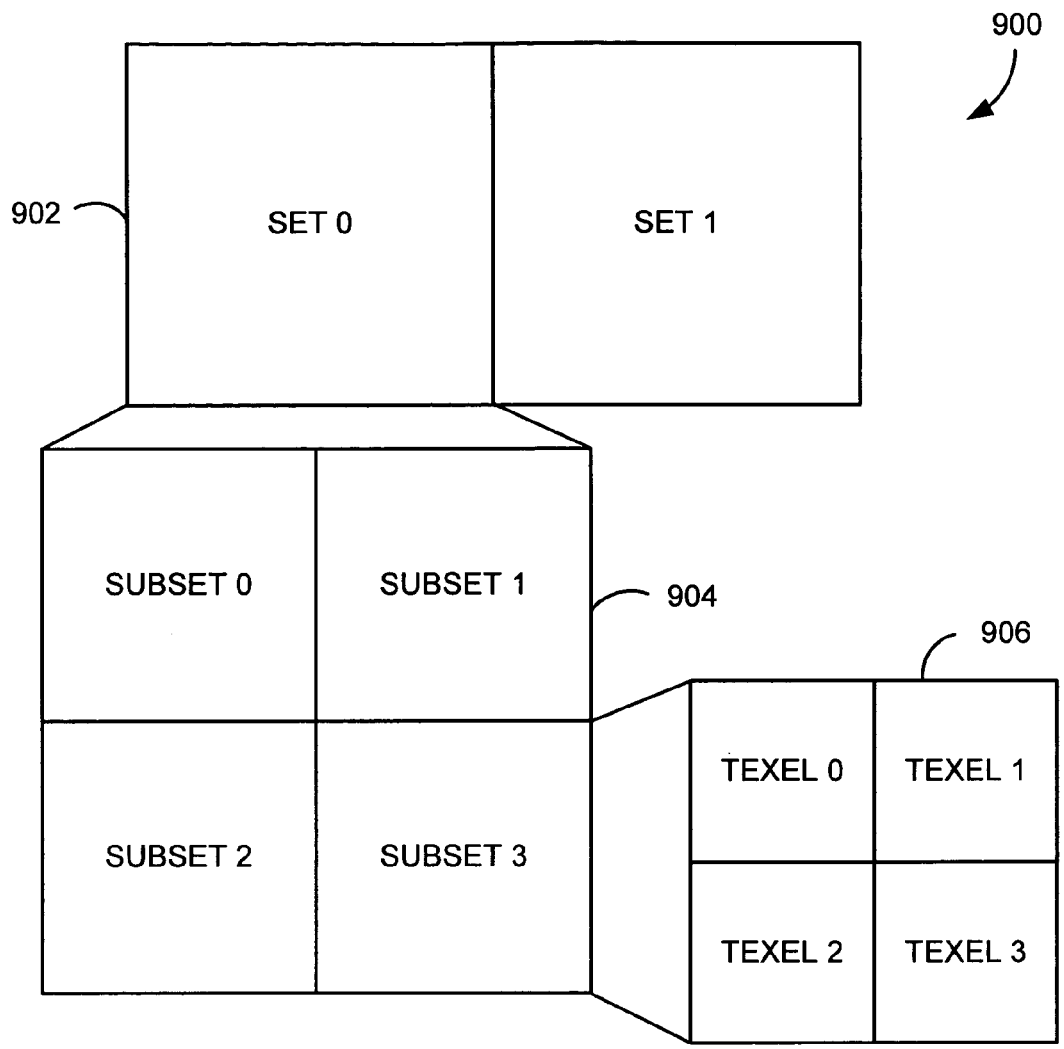
FIG. 9 is a block diagram illustrating an alternate view of an exemplary L1 organizational format.

Brief reference is now made to FIG. 9, which is a block diagram illustrating an alternate view of an exemplary L1 organizational format. One L1 data line 900 is shown to be divided into two sets 902. Each of the sets 902 is subdivided into four subsets 904 and each of the subsets 904 contains the texture data for four texels 906.

Figure 10:
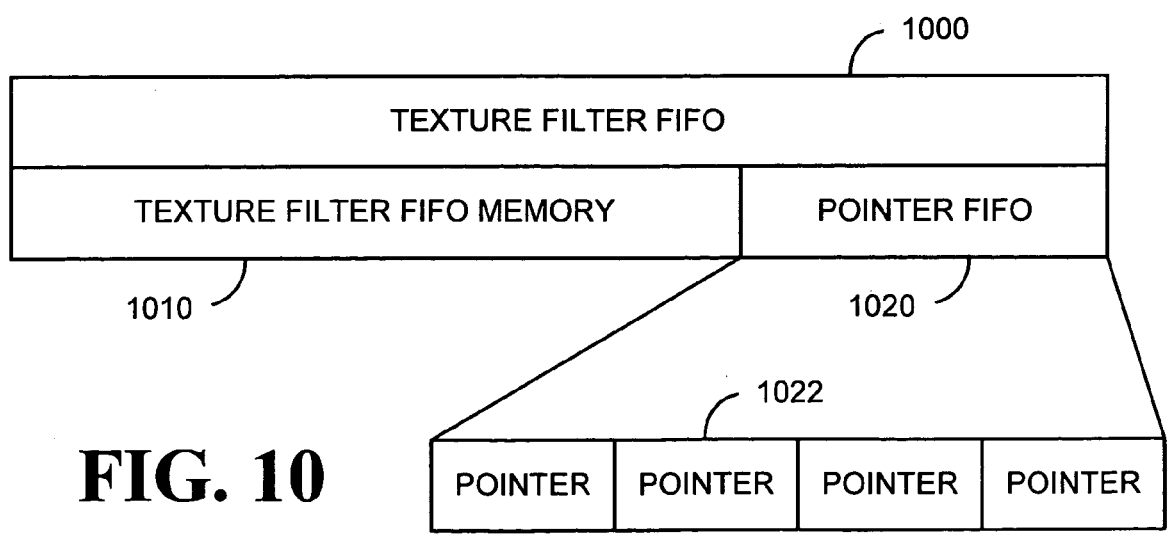
FIG. 10 is a block diagram illustrating a format of an exemplary texture filter FIFO, as discussed regarding FIG. 4.

Reference is now made to FIG. 10, which is a block diagram illustrating a format of an exemplary texture filter FIFO 1000, as discussed regarding FIG. 4. The texture filter FIFO 1000 compensates for the missing texture data latency between the system memory and L2. In an embodiment, the texture filter FIFO 1000 is the primary interface between the texture caches and the texture filters where almost all necessary information is passed from the texture caches to the texture filter unit. The data in the texture filter FIFO 1000 as shown in FIG. 10 is formatted into two primary components. The first component is the texture filter FIFO memory 1010, which stores all of the pixel related data to be used by the texture filter. The second component of the texture filter FIFO is the pointer FIFO 1020, which stores the memory addresses of the data written to the texture filter FIFO memory 1010. The pointer FIFO is divided into multiple smaller pointer FIFO's 1022, such that when the pointer FIFO 1020 is read there will be multiple addresses accessed at the same time.

The foregoing discussion of FIGS. 4-10 is summarily described herein, as many of the features shown in these drawings will be understood by persons skilled in the art. In this regard, the illustrated features and description have been provided to illustrate certain concepts and features of embodiments of the present disclosure, as described herein.

Reference is now made to FIG. 11, which is a diagram illustrating an exemplary adaptive missing data table, as disclosed herein. There are two primary types of data entries in the exemplary adaptive missing data table. The first is a hit/miss flag 1118 associated with each pixel in the packet for each filter element. This hit/miss flag 1118 is generated for every subset in an L1 data line. For example, the notation in the top row "P0F1" 1112 indicates that all of the data in that column of the table corresponds to pixel 0 in filter element 1. Similarly, the notation "P0F2" 1114 corresponds to pixel 0 in filter element 2. The first column 1120 lists the set/subset combination in an L1 data line. For example, the notation "S1/SS3" 1122 represents the row of hit/miss flags 1118 and missing texture data addresses 1134 associated with subset 3 in set 1.

The second type of data entry is a texture data address for data that is determined to be missing after an L1 hit test. The column of data labeled "1$^{st}$ MISS" 1130 stores the texture data address 1134 for the first instance of missing data associated with a valid pixel located in that specific subset. The column of data labeled "2$^{nd}$ MISS" 1132 stores the texture data address 1134 for the second instance of missing data associated with a valid pixel located in that specific subset. The logic, which manages the adaptive missing data table, repeats until all texture data is available to the filter for subsequent processing. If the logic determines that a third instance of missing data exists then the table will adapt by adding a third column corresponding to a third miss. For each pixel/filter entry element, a bit is passed down to indicate whether the pixel in the packet is valid. The pixel valid bits 1116 are shown in the second row of the table. In the event a pixel is not valid, no tags will be generated for that pixel. In some embodiments, the adaptive missing data table is a logical table that resides in the logic during the processing and does not occupy a physical memory address location.

Figure 12:
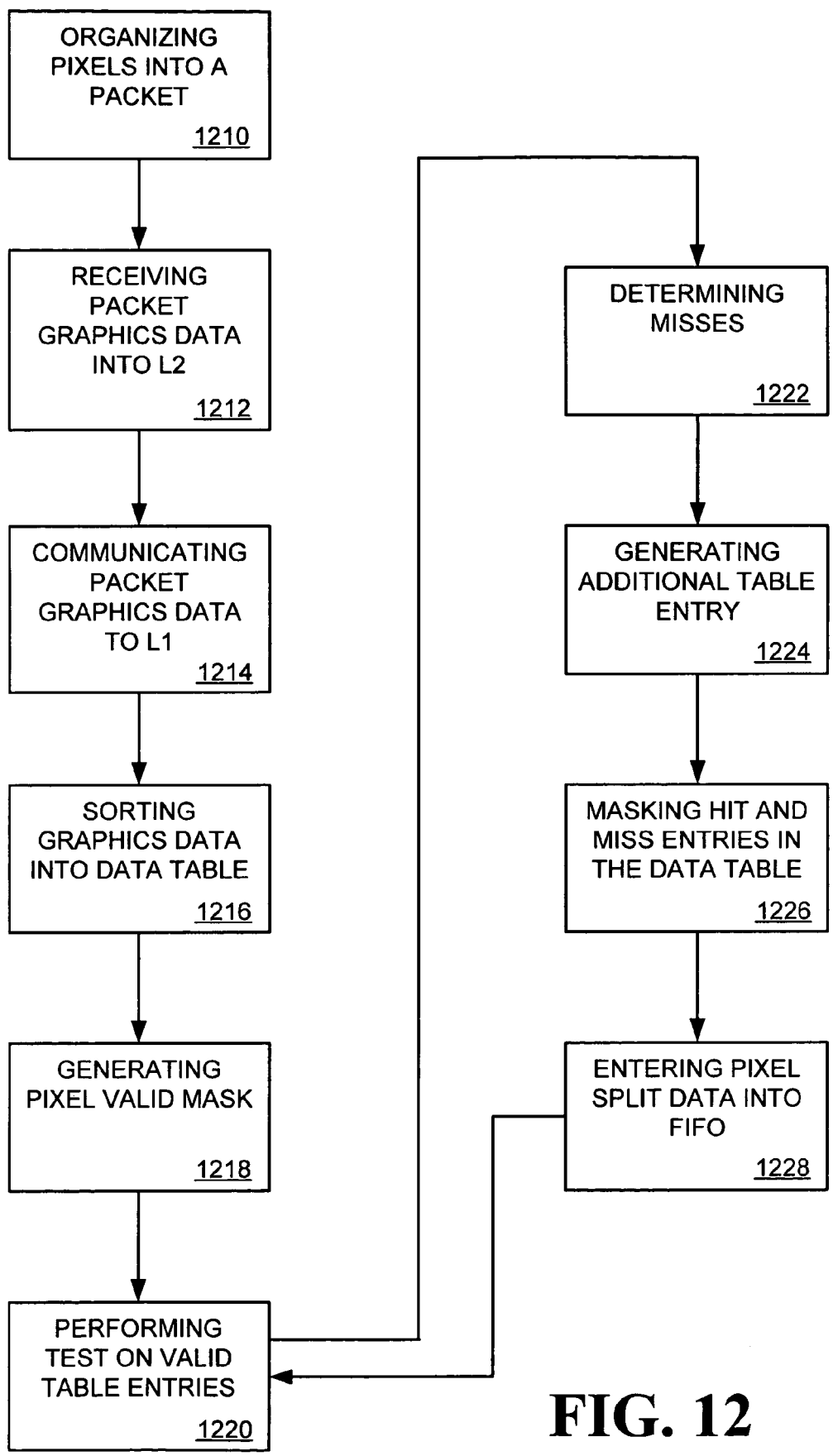
FIG. 12 is a flow chart illustrating a method of performing the methods disclosed herein.

Reference is now made to FIG. 12, which is a block diagram illustrating a method of performing the methods disclosed herein. First step 1210 organizes a group of pixels into a packet for processing. The packet may include 2, 4, 8 or 16 pixels among others and is optimally determined by many system properties. In step 1212 graphics data associated with the pixels in the packet is received by L2 to provide texture data for the texture filter. The graphics data is communicated from L2 to L1 in step 1214, such that in L1 the data is presented to the filter in a set-associative organizational format. As discussed previously regarding FIGS. 4 and 7, the set-associative mapping is performed by a data formatter between L2 and L1.

In step 1216, components of the graphics data are sorted into an adaptive missing data table, as previously discussed regarding FIG. 11, such that the table has entries to store the texture address data for every pixel in the packet. Pixel valid bits are passed down to the adaptive missing data table in step 1218 to mask off any pixels in the packet, such that no texture address data will be generated for invalid pixels and the final texture data will be ignored. A hit test is performed on a row of table entries for valid pixels in step 1220 to determine the first miss, if any, within the data for that subset in step 1222. If there is any missing data as a result of the hit test, then a column is added to the table for storing the texture address data of the missing data in step 1224. The newly added column lists the missing texture address data for the first application of the hit test, also called the first miss. In step 1226, both hit and miss entries in the table are masked from further analysis within the table. The hit entries are masked because any other entry having the same texture address data as a hit does not require further evaluation. The missing data is masked because the missing texture address data will be put into the texture filter FIFO for retrieval from system memory. The missing data may also be determined to be available in L2 based on an L2 hit test. The hit test 1220 is again performed on each row and then repeated to find second misses 1222. If a second miss is detected, the another column is added to the table 1224 such that the table dimensions adapt to the requirements of the data. Additionally, the hit and miss data is masked based on the second hit test in step 1226 and the pixel split data is entered into the texture filter FIFO 1228. The sequence of steps 1220-1228 will continue to repeat until there are no missing entries in the table.

For optimization of the data flow to the texture filter using the adaptive missing data table, the system will split the pixel data across more than one cycle if there are more than a certain number of misses in any subset. For example, if there is a second miss in any subset, an optimization may dictate that a pixel split condition exists since a second miss may indicate that the data covers too much map space or is too distributed over the map space, thus creating the result that L1 cannot store all of the texels needed for all of the valid pixels in the packet. The pixel split data is entered into the texture filter FIFO in step 1228. The number of passes that it takes to resolve the pixel data is the same as the number of additional columns for missing data. Since some pixel data will remain unchanged regardless of how many passes are required, the pixel split entry into the texture filter FIFO includes one entry for the original pixel data and as many additional entries as are required for the pixel split data.

Figure 13:
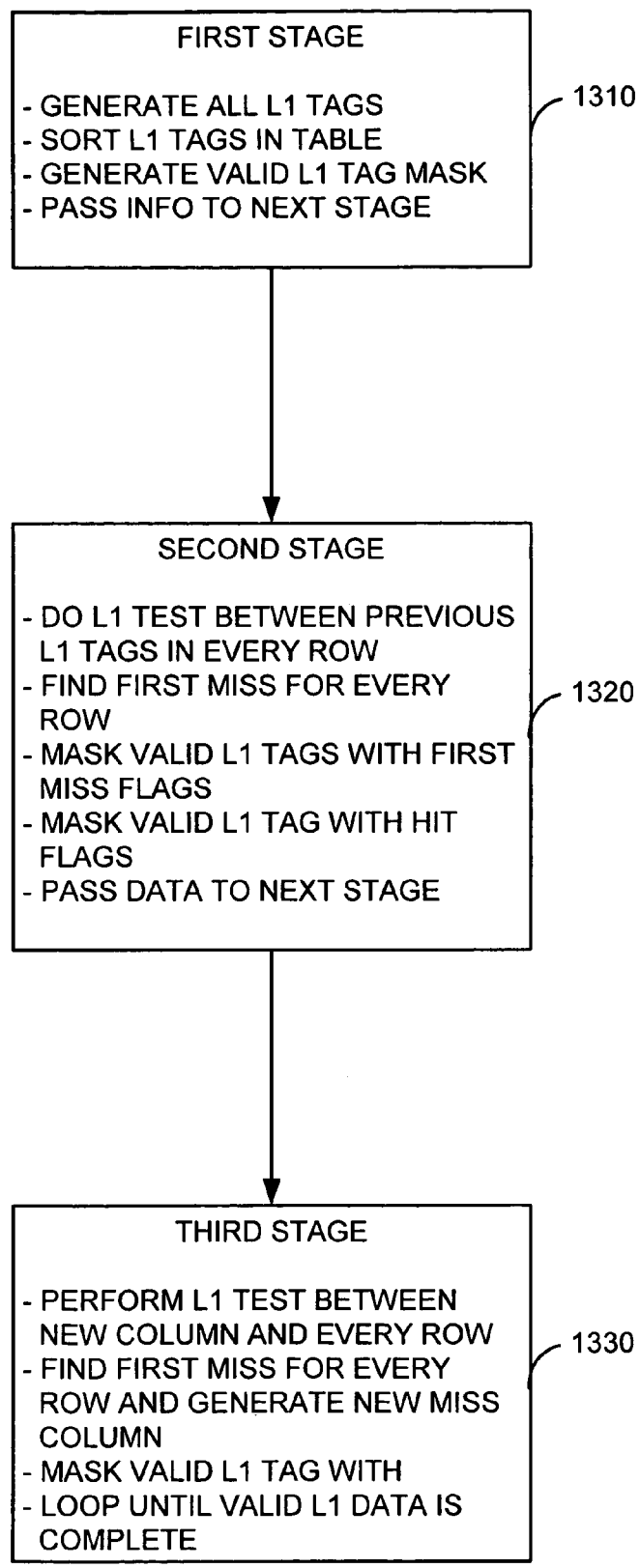
FIG. 13 is a flow chart illustrating an implementation of a splitting pixel data as disclosed herein.

Reference is now made to FIG. 13, which is a block diagram illustrating an implementation of splitting pixel data as disclosed herein. To meet the timing requirements, the pixel split is implemented in pipeline stages. The first stage 1310 generates all L1 texture address data based on the coordinate and texture data. For example, the coordinate data may be the (u, v) data and the texture data may be a texture identification number. Next, the L1 texture address data is sorted, per pixel, into an adaptive missing data table. A mask for indicating which of the pixels is valid is generated to prevent unnecessary subsequent data processing. The data is then passed to the second stage.

The second stage 1320 of the pixel split implementation performs a comparison test between previous L1 texture address data and every row of the adaptive missing data table. This prevents an unnecessary evaluation and possible request for L1 data that is already available. A test is performed on the valid pixels in the adaptive missing data table to determine the first miss in each row and a new column is generated in the adaptive missing data table. The texture address data for the first miss of each row is stored in that row's entry in the new column and also masked since that data is already determined to be a miss and will be requested through the texture filter FIFO or accessed from L2. After the test is performed, all of the valid pixels that generate a hit are masked since the hit data is available in L1 for subsequent texture filter processing. The data is then passed to the third stage.

The third stage 1330 begins with an L1 test between the new column generated in the second stage and every row of the table. A test is again performed to determine the first miss in every row and another new column is generated to store the texture address data for the first miss. The texture addresses for all valid pixels that are first misses and hits are masked. If a valid L1 texture address is cleared, then a notification is sent to the second stage so the next data can be processed. Additionally, hit data is combined with the data from the previous new column data to generate the texture filter FIFO split entry. The third stage 1330 will loop until all valid L1 texture address data is available for the texture filter.

The embodiments of the present disclosure can be implemented in hardware, software, firmware, or a combination thereof. In some embodiments, the methods and systems are implemented in software or firmware that is stored in a memory and that is executed by a suitable instruction execution system. If implemented in hardware, as in an alternative embodiment, the methods and systems can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of an embodiment of the present disclosure in which functions may be executed out of order from that shown or discussed, including substantially concurrently or in reverse order, depending on the functionality involved, as would be understood by those reasonably skilled in the art of the present disclosure.

The methods and systems herein, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory. In addition, the scope of the present disclosure includes embodying the functionality of embodiments of the present disclosure in logic embodied in hardware or software-configured mediums.

It should be emphasized that the above-described embodiments of the present disclosure, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

The following is claimed:

1. A graphics processing system, capable of operating on a packet comprising a plurality of pixels, such that each of the plurality of pixels corresponds to a plurality of texels having texel locations, the graphics system comprising:
   a first cache that receives texture data from a system memory and is partitioned into a plurality of slots;
   a data formatter that translates the texture data into set-associative texture data;
   a second cache that receives the set-associative texture data;
   a texture filter FIFO configured to store the set-associative texture data;

a texture filter unit that receives the set-associative texture data from the texture filter FIFO and produces a plurality of texture values corresponding to the plurality of pixels, such that the set-associative texture data available to the texture filter unit is filtered to produce the texture values for the plurality of pixels;

first test logic configured to perform a hit test on the second cache and then the first cache for misses in the second cache;

and a logical data table, maintained in the first test logic, that stores a plurality of status flags relative to the hit test; wherein, the second cache comprises a plurality of sets, wherein the each of the plurality of sets comprises a plurality of subsets and wherein each of the plurality of subsets comprises a subset of the plurality of texels;

the plurality of pixels comprises a first axis in the data table; and the plurality of subsets in the plurality of sets comprises a second axis in the data table.

2. The system of claim 1, wherein the texture filter unit comprises a plurality of texture filters, such that a subset of the plurality of pixels is processed by one of the plurality of texture filters.

3. The system of claim 1, wherein the plurality of status flags indicate a hit/miss status for each of the plurality of pixels in each of the plurality of subsets.

4. The system of claim 1, wherein the data table comprises a plurality of pixel valid flags corresponding to the plurality of pixels.

5. The system of claim 4, further comprising second test logic configured to analyze the logical data table, wherein when a first miss corresponding to a valid pixel for one of the plurality of subsets is detected, a missing entry position in the logical data table is generated, for storing a missing second cache texture address, such that the second test logic generates a first miss data set corresponding to the plurality of subsets.

6. The system of claim 5, wherein the second test logic is configured such that an entry corresponding to the missing second cache texture address is generated in the texture filter FIFO.

7. The system of claim 6, wherein the second test logic is configured such that logical data table entries, corresponding to the same address as the missing second cache texture address, are masked.

8. The system of claim 7, wherein the second test logic is configured such that if one of the plurality of status flags is a hit, then a corresponding second cache texture address is masked with a hit flag.

9. The system of claim 7, wherein the second test logic is configured such that if one of the plurality of status flags is a miss, then a corresponding second cache texture address is masked with a first miss flag.

10. The system of claim 7, wherein the second test logic is configured such that the second test logic loops until each of the plurality of second texture cache addresses is a hit.

11. A method for processing texture data in a graphics processor, comprising the steps of:
organizing a plurality of pixels into a packet;
receiving texture data corresponding to the packet into a first cache;
communicating the texture data to a second cache;
sorting the texture data into a data table, wherein the data table comprises a first axis and a second axis;
generating a pixel valid mask that marks valid entries along the first axis of the data table;

performing a test of valid data entries in the data table;
determining a first miss texture address, for one of a plurality of subsets, wherein the subset represents one of a plurality of common second axis values;
generating an additional entry along the first axis having the one of the plurality of common second axis values;
masking the first miss texture address and hit texture addresses in the data table; and
entering pixel split data, including the hit texture addresses and the first miss texture address into a texture filter FIFO, to fetch missing data from memory.

12. The method of claim 11, wherein the texture data in the second cache is set-associative data, such that the second cache comprises a plurality of blocks, wherein each of the blocks comprises a plurality of sets, wherein each of the sets comprises a plurality of subsets, and wherein each of the subsets comprises a plurality of texels.

13. The method of claim 11, wherein the step of masking the first miss texture address further comprises masking all entries in the subset corresponding to a same texture data address.

14. The method of claim 11, wherein the texture filter FIFO further comprises:
texture filter FIFO memory that stores a texture data entry; and
a pointer FIFO that stores a logical address corresponding to the texture data entry in the texture filter FIFO memory.

15. The method of claim 14, wherein the pixel split data stored in the texture filter FIFO further comprises original pixel texture data and at least one entry comprising pixel split texture data.

16. The method of claim 11, wherein the steps of determining a first miss, generating an additional entry, masking the first miss texture address and hit texture addresses, and entering pixel split data are performed in a loop until the data table has no missing texture addresses.

17. A graphics processing apparatus, comprising:
a first cache that communicates texture data to a second cache, wherein the data corresponds to a packet and the packet comprises a plurality of pixels;
a data formatter that transforms the texture data received by the second cache into set-associative texture data;
an adaptive missing data table that increases in a first dimension according to the number of misses in the set-associative texture data; and
texture cache control logic that utilizes the adaptive missing table to split pixel texture data over more than one cycle, wherein the pixel texture data is received by a texture filter unit.

18. The graphics processing apparatus of claim 17, further comprising a texture filter FIFO that receives missed texture data, such that the missed texture data is retrieved from memory.

19. The graphics processing apparatus of claim 18, further comprising a filter means for providing a texture value corresponding to each of the plurality of pixels.

20. The graphics processing apparatus of claim 17, wherein the adaptive miss table further comprises a plurality of pixel valid flags that identify which of the plurality of pixels in the packet are valid.

21. The graphics processing apparatus of claim 17, wherein the adaptive miss table further comprises a status flag corresponding to each of a plurality of subsets of texture data for each of the plurality of pixels.

22. The graphics processing apparatus of claim 17, wherein an additional column is added to the adaptive missing table for storing texture address data corresponding to a first miss in each row.

23. The graphics processing apparatus of claim 17, wherein the adaptive missing table is a logical table.

24. The graphics processing apparatus of claim 17, wherein the texture cache control logic repeats until the adaptive missing table resolves all misses, such that each pass having a miss generates a column in the adaptive missing table for storing texture address data.

25. The graphics processing apparatus of claim 17, further comprising a texture filter FIFO, for receiving texture address data corresponding to misses in the set-associative data, such that missing data is retrieved from memory.

\* \* \* \* \*